(12) United States Patent
Tovani et al.

(10) Patent No.: US 8,544,827 B1
(45) Date of Patent: Oct. 1, 2013

(54) NESTED NOZZLE MIXER

(75) Inventors: Ernest Peter Tovani, Englewood, CO (US); Gary D. Matzen, Longmont, CO (US)

(73) Assignee: Nested Nozzle Mixers, Inc., Centennial, CO (US)

( * ) Notice: Subject to any disclaimer, the term of this patent is extended or adjusted under 35 U.S.C. 154(b) by 827 days.

(21) Appl. No.: 12/767,901

(22) Filed: Apr. 27, 2010

Related U.S. Application Data

(60) Provisional application No. 61/173,226, filed on Apr. 28, 2009.

(51) Int. Cl.
| | |
|---|---|
| *F02M 37/00* | (2006.01) |
| *B01D 47/02* | (2006.01) |
| *B01F 15/02* | (2006.01) |
| *B01F 15/00* | (2006.01) |

(52) U.S. Cl.
USPC ......... 261/36.1; 261/77; 366/137; 366/163.2; 366/173.2; 366/178.1

(58) Field of Classification Search
USPC ............. 366/167.1, 262, 263, 264, 265, 270, 366/173.1, 137, 163.2, 173.2, 178.1; 261/36.1, 261/77, 116, DIG. 75
See application file for complete search history.

(56) References Cited

U.S. PATENT DOCUMENTS

| | | | |
|---|---|---|---|
| 3,440,781 A | 4/1969 | Lott | |
| 3,466,817 A | 9/1969 | Hagel | |
| 3,724,147 A | 4/1973 | Levenson | |
| 3,805,461 A | 4/1974 | Jagoda | |
| 3,853,764 A | 12/1974 | Armstrong | |
| 3,938,738 A | 2/1976 | Nagel et al. | |
| 3,942,291 A | 3/1976 | Hirata et al. | |
| 4,007,921 A * | 2/1977 | Zingg | ............................ 366/136 |
| 4,035,973 A | 7/1977 | Sutelan | |
| 4,049,195 A | 9/1977 | Rugenstein | |

(Continued)

FOREIGN PATENT DOCUMENTS

| | | |
|---|---|---|
| GB | 2356446 | 11/1999 |
| WO | WO91/15287 | 10/1991 |

(Continued)

OTHER PUBLICATIONS

The Denver Post, Author: Raabe, Steve, Article—not titled—1 page dated Mar. 6, 2009. (attached).

(Continued)

*Primary Examiner* — Charles E Cooley
*Assistant Examiner* — Anshu Bhatia
(74) *Attorney, Agent, or Firm* — Bryan Cave LLP

(57) ABSTRACT

A mixer designed to generate high mixing turbulence within the bottom zone of a liquid holding vessel while simultaneously entraining and transferring liquid from the upper surface down to the vessel bottom. Mixing action is accomplished through the incorporation of two jet nozzles, nested one inside the other, strategically located and powered by pressurized liquid drawn from the vessel being mixed. Mixer component dimensions are adaptable to multiple vessel types and configurations. Surface liquids are entrained using a weir section that is either a fixed or floating component of the mixer assembly. Liquid used for developing outlet velocity in primary jet is drawn from multiple locations including the vessel center zone, the vessel bottom and mixer annulus. Mixing in the vessel center zone can vary from gentle upward flow in tall tanks to complete turbulent mixing in shallow vessels.

3 Claims, 12 Drawing Sheets

(56) References Cited

U.S. PATENT DOCUMENTS

| | | | |
|---|---|---|---|
| 4,051,204 A | 9/1977 | Muller et al. | |
| 4,086,663 A | 4/1978 | Croft | |
| 4,136,023 A | 1/1979 | Kirk et al. | |
| 4,141,184 A | 2/1979 | Vidal | |
| 4,162,971 A | 7/1979 | Zlokarnik et al. | |
| 4,204,955 A | 5/1980 | Armstrong | |
| 4,234,560 A * | 11/1980 | Kuerten et al. | 261/123 |
| 4,246,099 A | 1/1981 | Gould et al. | |
| 4,255,262 A | 3/1981 | O'Cheskey et al. | |
| 4,275,020 A | 6/1981 | DiGregorio et al. | |
| 4,275,538 A | 6/1981 | Bounds | |
| 4,317,723 A | 3/1982 | Rapp et al. | |
| 4,372,856 A | 2/1983 | Morrison | |
| 4,462,390 A | 7/1984 | Holdridge et al. | |
| 4,545,907 A | 10/1985 | Repin | |
| 4,564,480 A | 1/1986 | Kamelmacher | |
| 4,599,167 A | 7/1986 | Benjes et al. | |
| 4,599,168 A | 7/1986 | Benjes et al. | |
| 4,633,909 A | 1/1987 | Louboutin et al. | |
| 4,662,759 A | 5/1987 | Leibee et al. | |
| 4,683,122 A | 7/1987 | Concordia et al. | |
| 4,690,764 A | 9/1987 | Okumura et al. | |
| 4,738,540 A * | 4/1988 | Banks | 366/137 |
| 4,750,454 A | 6/1988 | Santina et al. | |
| 4,880,313 A | 11/1989 | Loquenz et al. | |
| 4,885,094 A | 12/1989 | Srinivasan et al. | |
| 5,154,898 A | 10/1992 | Ajinkya et al. | |
| 5,190,374 A | 3/1993 | Harms et al. | |
| 5,199,231 A | 4/1993 | Dever | |
| 5,394,827 A | 3/1995 | Cheng | |
| 5,489,380 A | 2/1996 | Gaddis | |
| 5,681,109 A | 10/1997 | Palmer | |
| 5,735,600 A | 4/1998 | Wyness et al. | |
| 5,798,061 A | 8/1998 | Gaddis | |
| 5,942,116 A | 8/1999 | Clark et al. | |
| 6,110,255 A | 8/2000 | Williams et al. | |
| 6,279,277 B1 | 8/2001 | Zittmayr | |
| 6,395,175 B1 | 5/2002 | Gao et al. | |
| 6,440,317 B1 | 8/2002 | Koethe | |
| 6,464,875 B1 | 10/2002 | Woodruff | |
| 6,522,031 B2 | 2/2003 | Provanzana et al. | |
| 6,657,021 B2 | 12/2003 | Chanmayou et al. | |
| 6,764,213 B2 | 7/2004 | Shechter | |
| 6,998,056 B2 | 2/2006 | Scherzinger et al. | |
| 7,135,155 B1 | 11/2006 | Long, Jr. et al. | |
| 2002/0020677 A1 | 2/2002 | Noll | |
| 2003/0071372 A1 | 4/2003 | Scherzinger et al. | |
| 2003/0102752 A1 | 6/2003 | Mathisen | |
| 2003/0141229 A1 | 7/2003 | Chaffee | |
| 2004/0065590 A1 | 4/2004 | Chan et al. | |
| 2004/0148690 A1 | 8/2004 | Freeman | |
| 2004/0267408 A1 | 12/2004 | Kramer | |
| 2005/0029189 A1 | 2/2005 | Langhans et al. | |
| 2005/0111298 A1 | 5/2005 | Lott | |
| 2005/0246919 A1 | 11/2005 | Delons | |
| 2005/0279035 A1 | 12/2005 | Donovan | |
| 2006/0156725 A1 | 7/2006 | Kenessey | |
| 2006/0186042 A1 | 8/2006 | Keeton, Jr. | |
| 2006/0266703 A1 | 11/2006 | Stroot et al. | |
| 2007/0017228 A1 | 1/2007 | Surma | |
| 2007/0193948 A1 | 8/2007 | Livingston et al. | |
| 2008/0017558 A1 | 1/2008 | Pollock et al. | |
| 2008/0023397 A1 | 1/2008 | Clifford et al. | |

FOREIGN PATENT DOCUMENTS

| | | |
|---|---|---|
| WO | WO92/03220 | 3/1992 |
| WO | WO2005054594 | 6/2005 |
| WO | WO2006116658 | 11/2006 |

OTHER PUBLICATIONS

Scientific American, Biofuels, Article Titled: "Grassoline at the Pump", authors: George W. Huber and Bruce E. Dale, Jul. 2009, pp. 52-59. (attached).

"HCR process for the waste water treatment", author: Hyung Chang Communications, information booklet (attached).

* cited by examiner

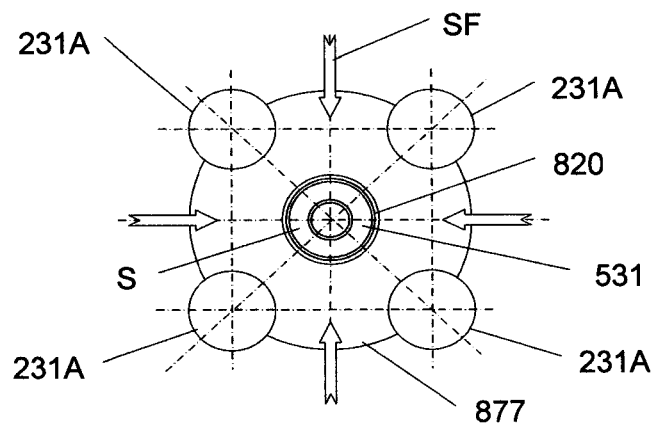
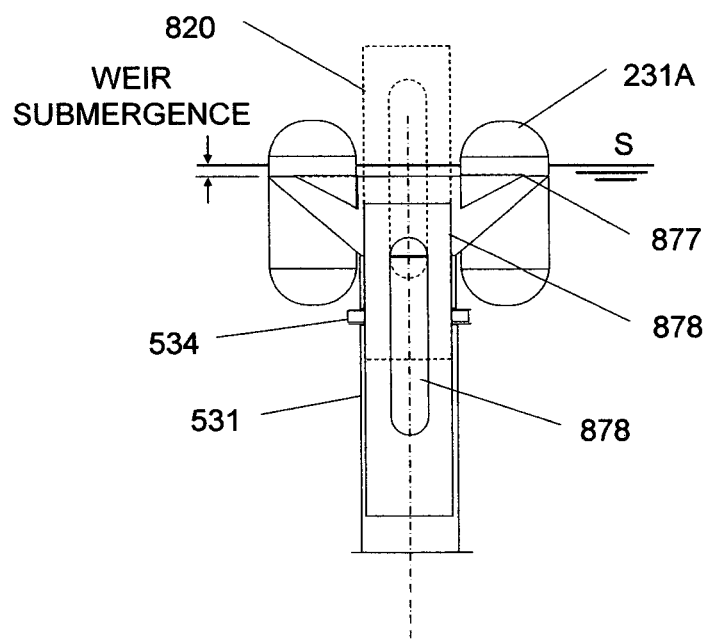

ELEVATION VIEW

PLAN VIEW

NESTED NOZZLE MIXER

CROSS REFERENCE APPLICATIONS

This application is a non-provisional application claiming the benefits of provisional application No. 61/173,226 filed Apr. 28, 2009.

FIELD OF INVENTION

The present invention relates to a vertical nested nozzle recirculation system in a waste holding vessel to improve the mixing of a bottom (settled) slurry layer with a middle (suspension central mixing layer) with a top (foam/froth) layer.

BACKGROUND OF THE INVENTION

Future energy efficient buildings will aim at being free from the use of fossil fuels. FIGS. 1, 1a show a building 1 having mixed use residential/commercial space 5. Clean energy is derived from the building's shape which functions as a solar collector as the earth orbits the sun. Wind energy is derived from a turbine section 4. See Pub. No. US2006/0156725 incorporated herein by reference. Curtain wall material-science technology panels are used throughout wherein the panels reflect solar heat in the summer and transmit solar heat in the winter. All black and grey water exits separate pipes in shaft 7. A black/grey waste processing system 6 includes mixing systems in digesters 8. Oxygen producing plants 3 are incorporated in the terraced roof system that can be a greenhouse. The waste processing system 6 could generate enough electricity to power building 1. The black and grey water shaft 7 enter a single stream recycle waste storage bin set 70. Next a grey waste clarifier 71 clarifies the grey waste. Nest the settled grey waste is held in bins 72. Next a sewage clarifier 73 further clarifies the settled grey waste from bins 72. Next the liquid pretreatment processor 73 readies the slurry for injection into the digesters 8. Output from the digesters 8 includes a water treatment facility 74, and biogas goes to the biogas treatment processor 75. Next the biogas goes to the natural gas pipeline 76 to the facility boilers 77. Steam from the facility boilers 77 powers the electric generators 78. The composter reactor 79 readies the solid waste for removal. A microfiltration unit 80 readies digester water output for delivery to the storage pond 81, which could also hold excess from clarifiers 71, 73.

The main aspect of the present invention is to improve the efficiency of the digesters 8, or in any vertical liquid slurry vessel.

Related art includes U.S. Pat. No. 4,690,764 (1987) to Okumura et al. which discloses a horizontal aerator using a pressurized liquid nozzle nested in a gas inlet nozzle assembly, wherein oxygen in small bubbles is mixed into the raw water liquid. A fluid straightener ejects the aerated mixture into a water tank.

U.S. Pat. No. 5,942,116 (1999) discloses an anaerobic sludge digester having an egg shape. A central draft tube has pump to pump settled sludge at the bottom of the vessel up the tube to the top where spray nozzles create motion on the top surface.

The present invention is an apparatus for mixing both homogeneous liquids and non-homogeneous liquid slurries in vessels/reactors of varying geometry. Non-homogeneous slurries include mixtures of liquids, solids and gases in varying relative concentrations. The solids in non-homogeneous liquid slurries include both floating and settling constituents. The apparatus is capable of fully entraining floating and sinking solids for the purpose of promoting a chemical or biological reaction that changes the relative constituency of the slurry components that can vary from inert solids of varying size to complex organic molecules and particles.

Reactor dynamics can include control of slurries that can segregate in a variety of ways. Slurries can include a fully homogeneous liquid mixture entraining non-homogeneous materials. This material includes light solids trapped by rising gas bubbles that form a froth on the surface of the slurry. Materials of both high and low specific gravity tending to float or sink unless acted on by a positive mixing velocity gradient and fibrous and stringy materials. In many cases the ability of a reactor to perform the intended chemical/biological function depends on the operation of a device that blends both floating and settled slurry components with the liquid and neutrally buoyant slurry mass.

Reaction vessels can be built in many configurations. However, tall cylinders present an economical configuration for most reactor vessels that include both low and high-pressure environments. A variety of systems have been developed to accomplish the complete mixing of these reactors. Mixer types include submerged impeller gas bubble and jet draft tube and liquid jet types. Mixing devices differ in the way they accomplish entrainment of the vessel contents in the three general zones of interest within the reactor. These zones from top to bottom are the surface where slurry components can accumulate as a scum or froth. the center which includes suspended slurry components and the bottom where high specific gravity materials settle when mixing gradients are insufficient to maintain the material in the center mix zone.

It can be shown that the energy required of a given mixing system to completely entrain all components of a mixed slurry is greatest for vessel bottoms and surfaces where a range of from low to high specific gravity solids are present. Mixers can be designed either to induce sufficient energy into the slurry in the form of localized slurry velocity to completely mix all zones of the reactor or selectively mix specific zones of the vessel with the intent to direct sufficient energy to accomplish acceptable component-entrapment. The former method uses the largest amount of energy to accomplish mixing, while the latter requires a more complex system to do the work.

A simple mixer design capable of mixing liquid slurry in all zones of a vessel/reactor is needed as an improved, more efficient, more effective and more reliable method to do the work.

The present invention uses a double channel central draft tube. A pump forces fluid through a downward facing nozzle in the central channel. The high velocity fluid induces a vacuum in the outer channel to draw in sludge at various levels of the draft tube. The combined flows from the central and outer channels exit a second nozzle to hit the bottom of the vessel.

SUMMARY OF THE INVENTION

The main aspect of the present invention is to provide a dual channel central draft tube in a mixing vessel, wherein a nested nozzle configuration provides for a circulation of slurry both through a pressurized channel from the vessel bottom to the top of the center tube in the central draft tube as well as flow from various inlets at the outside of the central draft tube and out a common nozzle pointed toward the vessel bottom of the reactor. The magnitude and velocity of the combined flows through the center channel and outer channel via the nested nozzles is sufficient to mobilize and entrain solids that tend to settle and collect at the bottom of the reactor.

Other aspects of this invention will appear from the following description and appended claims, reference being made to the accompanying drawings forming a part of this specification wherein like reference characters designate corresponding parts in the several views.

The invention describes a mixer comprising two submerged nozzles (one nested inside the other) connected to piping and apparatus that simultaneously mixes liquid slurries in three general mixing zones (surface, center, and bottom) within a reactor. The device is simple in configuration and construction and reliable in operation.

Contents of the vessel being mixed is removed from a selected location within the reactor and pumped through the center nozzle at a minimum nozzle velocity of 20 feet per second. Liquid flowing at this velocity through the primary nozzle identified as the primary jet entrains liquid located in the annular space between nozzles and connecting piping effectively drawing liquid from the surface of the mixed vessel. This mixture of liquid and any floating portion of the vessel contents are conveyed through the annulus to the primary jet where it is entrained and injected into the bottom zone of the vessel. The magnitude of this flow is dependent upon the nested nozzle geometry, the magnitude of the primary velocity and the bulk density of the entrained mixture. Collectively this portion of flow combined with the primary jet flow is described herein as the secondary nozzle jet.

The secondary nozzle jet entrains additional liquid within the center and bottom zone of the vessel reactor. The magnitude of this flow is dependent upon the vessel/reactor geometry and the magnitude of the primary velocity. At the general conditions applicable to this invention this flow is projected to be from three to four times the flow through the secondary nozzle. The result is high flow in the bottom zone of the vessel/reactor characterized by a high velocity jet of mixed liquid impingement at the low point of the reactor. The magnitude of the liquid flow and velocity is sufficient to mobilize and entrain solids that tend to settle and collect in the bottom of the vessel.

In Summary this apparatus teaches:

1) A mixer of homogeneous and non-homogeneous liquids in storage/reactor vessel comprising:
a) a primary nozzle supply box
b) a mixer annulus section
c) a nested nozzle mixer head comprising a primary nozzle and supply pipe located inside a secondary nozzle and supply pipe
d) a float collection and liquid circulation apparatus.

2) The mixer as recited in paragraph 1 in which the means for operation is fluid drawn from various locations within the vessel and forced under pressure into the primary nozzle supply box.

3) The mixer as recited in paragraph 1, in which the primary nozzle supply box is constructed to allow installation and removal of the primary nozzle/supply pipe, secondary nozzle/supply pipe and float collection and liquid circulation apparatus from above the vessel.

4) The mixer as recited in paragraph 1, in which the means of entraining and transferring mass from the surface region of the tank is performed automatically using hydraulic head difference between vessel liquid level and the liquid level in the mixer annulus. The head difference being generated by the hydraulic operation of the nested nozzle apparatus whose component size and relative location is held to dimensional standards.

5) The mixer as recited in paragraph 1, in which the means of controlling the flow rate of liquid from the surface region of the tank is performed automatically using the hydraulic head difference between the vessel liquid level and the elevation of a submerged weir.

The weir comprising a part of the float collection and liquid circulation apparatus. The head difference being generated by the location of float collection and liquid circulation apparatus whose component size and location is held to dimensional standards.

6) The mixer as recited in paragraph 1, in which the float collection and liquid circulation apparatus is constructed as a floating device held in place by the secondary nozzle supply pipe. The head difference between the vessel liquid level and the elevation of the submerged weir being held constant by buoyancy of the apparatus whose component size and location is held to dimensional standards.

7) The mixer as recited in paragraph 1 in which the geometric requirement of the nested nozzle arrangement is held to dimensional standards provided in the descriptions of the invention.

8) The mixer as recited in paragraph 1, in which a geometric limitation to the nozzle convergence angle is provided in order to reduce the potential for the generation and formation of fine bubbles within the core of the nozzle. The converging angle of the primary nozzle from the liquid inlet end to outlet is limited to 4.0 degrees.

9) The mixer as recited in paragraph 1, in which the relative number of mixers required per vessel/reactor is unlimited depending only on the vessel configuration.

BRIEF DESCRIPTION OF THE DRAWINGS

FIG. 4 is a top plan view of a floating weir with four floats.

FIG. 5 is a side elevation view of a four float weir.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
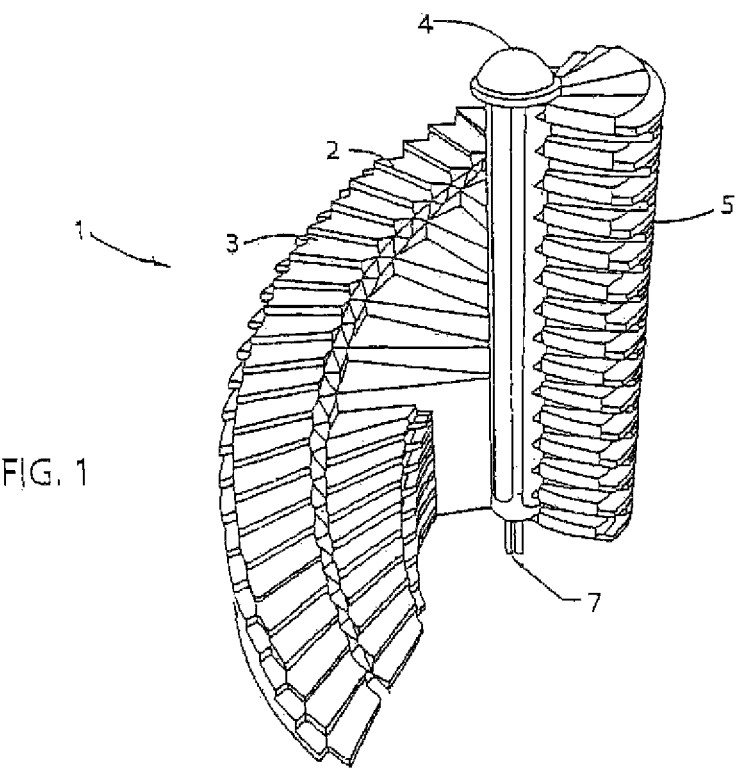
FIG. 1 is an isometric view of an energy efficient building.
Figure 1A:
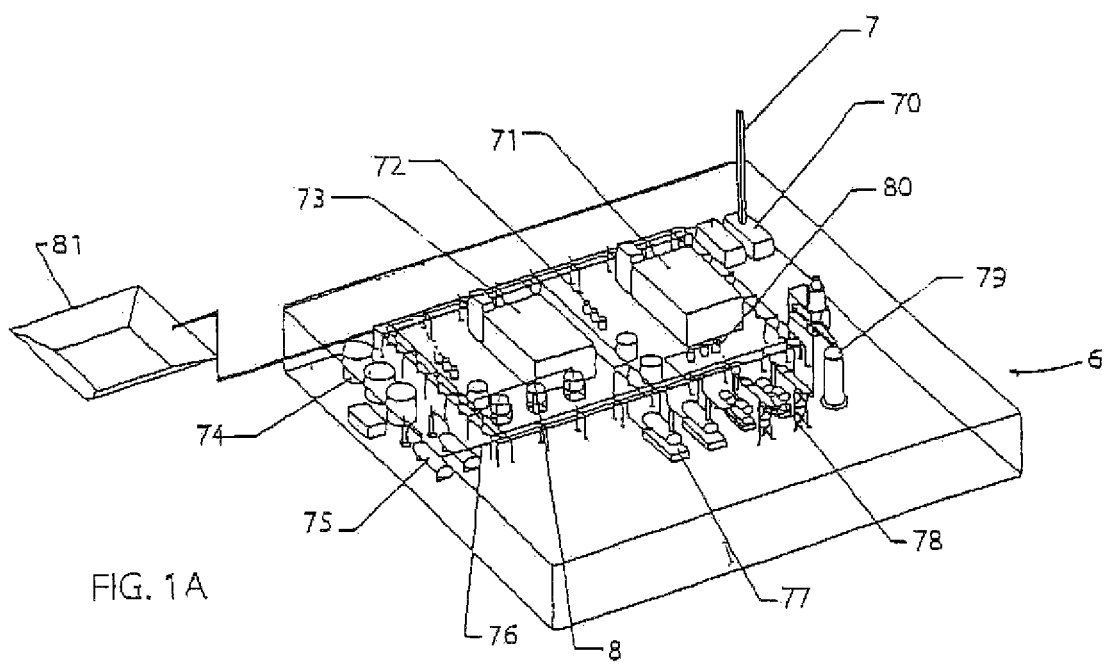
FIG. 1A is a schematic of a liquid waste processing system.
Figure 2:
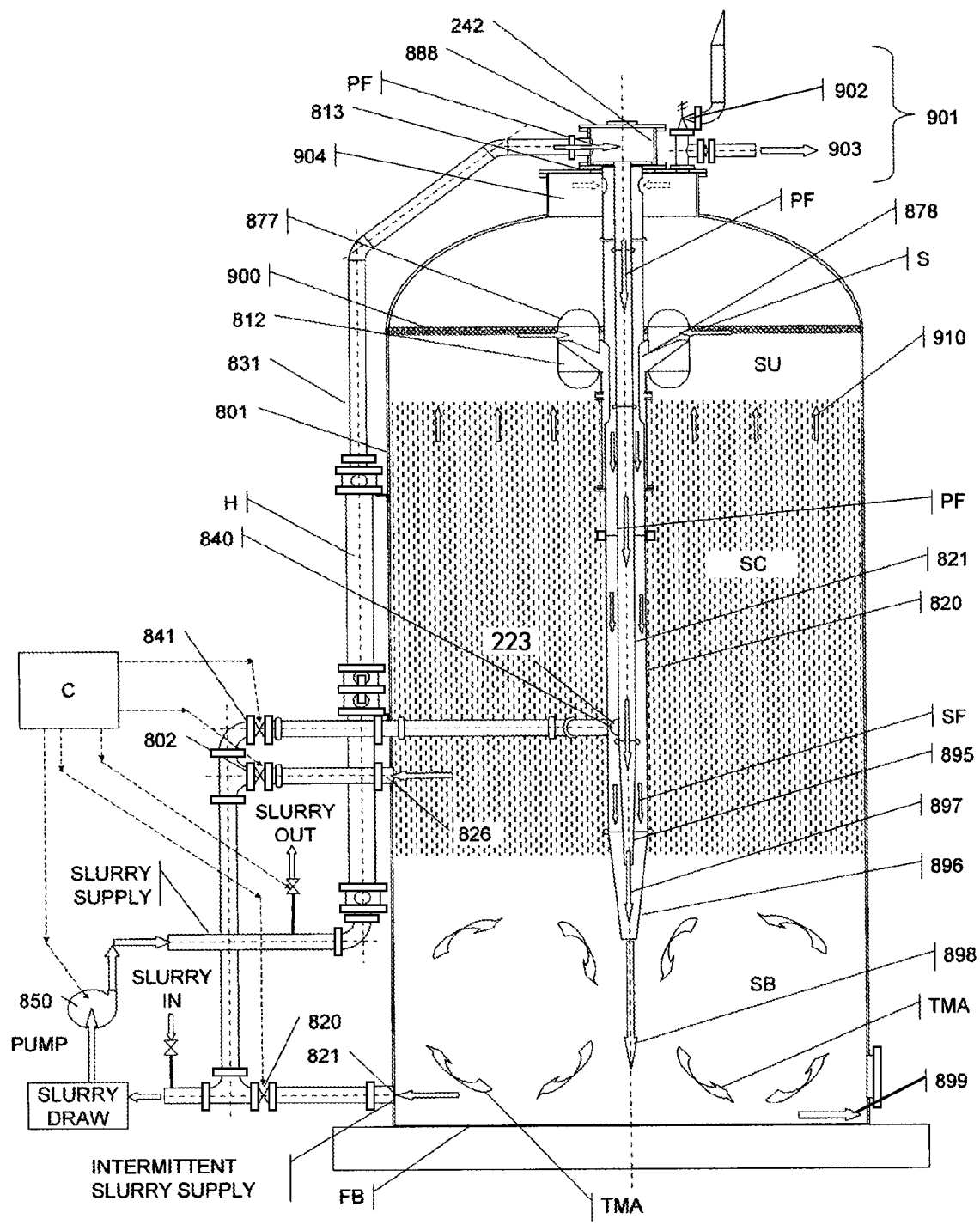
FIG. 2 is a cross sectional view of a reactor vessel using a central draft nested nozzle design.
Figure 3:
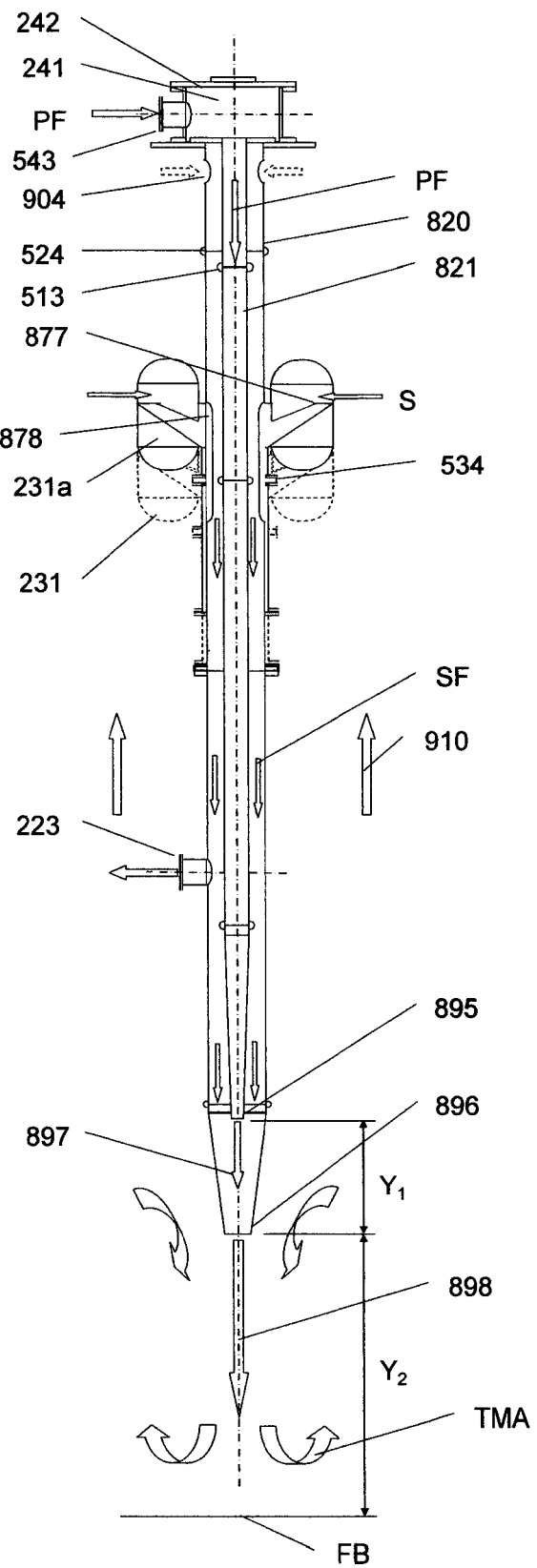
FIG. 3 is a side elevation view of a central draft nested nozzle having a floating weir for the upper inlet to the outer channel.

Referring first to FIG. 2 a reactor 801 has a variable geometry designed to take advantage of the mixer capabilities in a flat bottom FB reactor vessel. A single mixer assembly 888 is shown to be center mounted in the reactor 801. An outer tube 820 surrounds an inner tube 821. The primary flow is indicated by arrows PF in the inner tube 821. The secondary flow is indicated by arrows SF in the outer tube 820.

The primary flow PF is created by pump 850. Normally flow initiates at the center port 826 with valve 802 open and valve 820 closed. When valves 802, 820 are reversed primary flow initiates at port 821, however, solid matter could foul the pump 850. Slurry In/Slurry Out ports indicates one possible feed/discharge of slurry into and out of the reactor 801. Riser pipe 831 carries the pressurized primary flow PF to the inner tube 821. An intermittent port 840 can initiate the primary flow PF and/or be used in conjunction with port 826 depending on the position of valve 841. A controller C may control the pump 850 and valves as shown. The riser pipe 831 may have a heater H. The secondary flow SF indicates at surface as shown by arrows S. This reactor 801 has a floating weir 877 with inlet ports 878 into the secondary flow SF in the outer pipe 820.

The primary nozzle 895 has a discharge 897 which creates a vacuum via a venturi effect and draws the secondary flow SF downward. The primary nozzle 895 is nested in the secondary nozzle 896. Primary nozzle flow is in the range of 20-50 feet per second. (FPS) The primary nozzle has a taper angle of 4 degrees or less. The combined nozzle flow at 898 creates a minimum 5FPS impingement flow at the bottom FB and a minimum impingement at the wall shown by arrow 899.

The reactor 801 levels are the slurry bottom mixing zone SB, the slurry center mixing zone SC has suspended solids, and the slurry upper mixing zone SU has a top foam/froth layer 900. Arrows TMA show the circular turbulent mixing area.

The reactor head 901 consists of a flange 813 to support the tubes 820, 821. Tube 820 may have an annulus vent 904. The reactor 801 may or may not be pressure vessel depending on pressure control device 902. A gas outlet is shown at 903. Arrows 910 show how the downward facing nested nozzles 895, 896 create an upflow.

Referring next to FIGS. 2, 3, 4, 5 the primary nozzle supply box 242 diverts the horizontal primary flow PF to a downward primary flow PF in area 241. The primary flow PF usually ranges from 5-10 FPS. An alternate slurry removal point 223 is shown. Three or more ballast tanks 231 (dots 231b show movement) on the weir 877 supply buoyancy so the weir 877 floats below the liquid surfaces S. A cylindrical tube section 531 allows the weir 877 to slide up and down the outer tube 820. A leak control ring 534 is shown. Ports 878 to outer tube 820 may be slotted.

Figure 6:
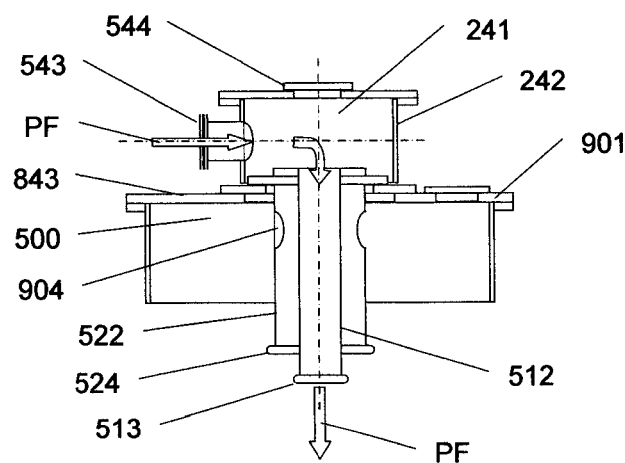
FIG. 6 is a side elevation view of the nested nozzle design connection to the vessel.

Referring next to FIG. 6 the head assembly 901 has a flanged hatch 544 for inspection of the primary nozzle supply box 242. Pipe couplings 513 (inner pipe 512) and 524 (outer pipe 820) are shown. The outer pipe supply section 522 is shown. Flange 843 covers opening 500. Pipe coupling 543 connects to pipe 831 (See FIG. 2).

Figure 7:
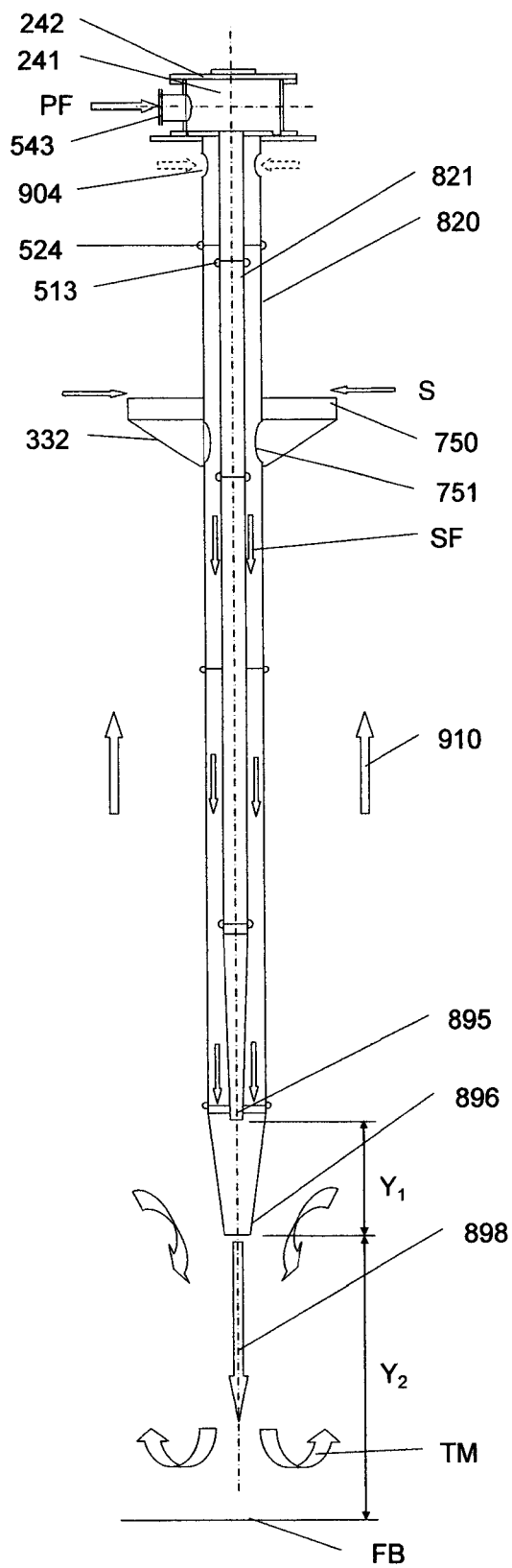
FIG. 7 is a side elevation view of a central draft nested nozzle design without a floating weir.

Referring next to FIG. 7 a fixed weir 750 collects slurry at a fixed surface level S. The weir 750 funnels the slurry into the secondary flow inlet 751.

Figure 8:
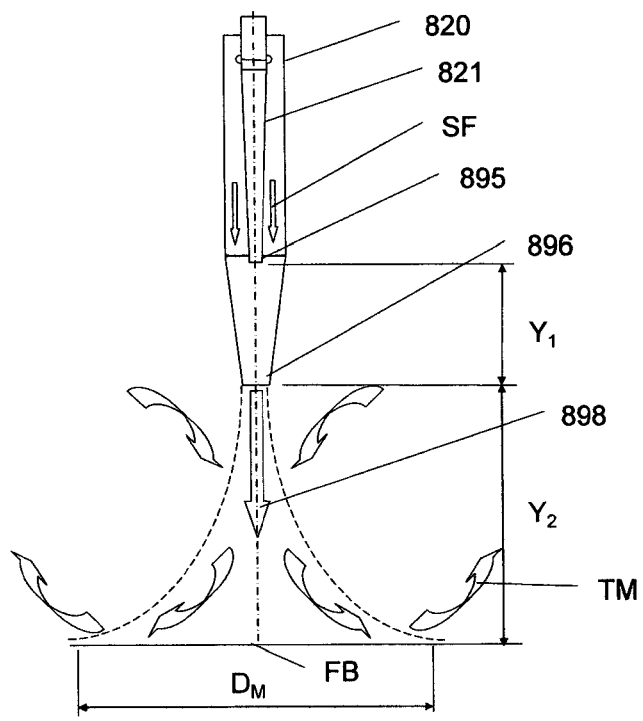
FIG. 8 is a close up view of the nested nozzles shown in FIG. 3.

Referring next to FIG. 8 some critical dimensions are shown.

The configuration of the nested nozzles of the present mixer invention is shown in FIG. 7. Critical dimension restrictions are identified in the figure as "DM", "Y1" and "Y2". Here "DM" identifies the zone of pressure of the jet impinging on the vessel bottom. This dimension identifies the influence area of the nozzle and is used to determine the size and number of mixers to be used in vessels of varying bottom diameter. The dimensions "DM", "Y1" and "Y2" as well as the diameter of the secondary nozzle are calculated based upon the primary nozzle size selected. The criteria for establishing these values are provided hereinafter.

As seen in FIGS. 1, 2, 3, 8 and 9 the secondary nozzle discharge outlet is oriented vertically at a location near the bottom of the vessel/reactor.

The secondary jet velocity and the external flow entrained by the jet action impinges on the vessel bottom resulting in high mixing energy that mobilizes and entrains the heavy solids preventing accumulation at the vessel bottom.

The mixing energy generated below the mixer nozzle decays within the liquid slurry in the zone above the nozzle resulting in a tendency of heavy solids to settle back into the high shear zone near the mixer nozzle. A zone of mixed solids exists due to the balance of forces that tend to mix and convey solids towards the top of the vessel opposed by the solids falling as a result of particle density and geometry. In tall reactor vessels this zone of mixed heavy solids tends to improve the reaction dynamic of suspended solids, can thicken the liquid slurry when liquid is selectively removed from the vessel in areas above the zone and increases the residence time of heavier solids within the vessel/reactor.

When required, heavy solid removal is accomplished by extracting slurry from the bottom zone of the vessel. The method for removing liquid slurry from the bottom area of the vessel is not an embodiment of the invention.

The geometric requirement of the nested nozzle arrangement is illustrated in the embodiment of the invention in FIG. 7 in order to accomplish heavy solid mixing at the bottom of the vessel/reactor.

The range of values of critical dimensions is as follows:
Nozzle Diameter Ratio $$d2/d1=C1$$

Where:
   $d2$=Secondary Nozzle ID (in.)
   $d1$=Primary Nozzle ID (in.)
   $C_1$=2.1-2.5 (range)
Nozzle Separation $$Y1=C2 \times d1$$

Where:
   Y1=Distance between the outlet end of the primary and secondary nozzles (in.)
   C2=6.0-6.4 (range)
Secondary Nozzle Location $$Y2=C3 \times d1 \times Vo-Y1=(C3 \times Vo-C2) \times d_1$$

Where:
   Y2=Distance between end of secondary nozzle and vessel bottom (in.)
   Vo=Primary nozzle outlet velocity (54 per second)
   C3=1.2-1.5 (range)
Mixer Influence Diameter $$Dm=C4 \times d1 \times Vo$$

Where:
    Dm=Mixer influence diameter at vessel Floor (in.)
    C4=2.6-3.3 (range)

In addition a geometric imitation to the nozzle convergence angle is claimed in order to reduce the potential for the generation and formation of fine bubbles within the core of the nozzle jet when mixing Liquid slurry that is saturated with a gas. This gas can take the form of air products entrained in the liquid or a product of reaction within the vessel that forms a gas, which saturates the bulk slurry within the vessel. In these cases the converging angle of the nozzle from the liquid inlet end to outlet is limited to 4.0 degrees.

Foam Froth and Emulsion Control

Foam, froth and/or emulsion control is accomplished by the entrainment and transfer of surface mass into the annulus of the pipe-way supporting and supplying the secondary nozzle. This liquid mass is transported to the secondary nozzle located near the vessel bottom and mixed with both flow through the primary nozzle and the liquid mass contents at the bottom of the tank. The liquid surface level within the pipe way annulus is depressed below the liquid level in the vessel via the phenomena of hydraulic interaction between the primary and secondary nozzles. The level difference is determined by the geometry of the nested nozzle arrangement, the primary nozzle liquid velocity, the proximity of the secondary to the vessel bottom, the intrinsic properties of the liquid slurry being pumped and the degree of liquid entrainment through the annulus pipe-way. The geometric requirement of the nested nozzle arrangement is illustrated in the embodiment of the invention shown in FIGS. 2, 3, 7 and 8. The range of values of critical dimensions of the nested nozzle arrangement has been described hereinbefore.

Conveyance of surface liquid to the pipe-way annulus is accomplished via the incorporation of a surface device that includes an overflow or weir section that allows flow when differing elevation of the vessel contents between the inside and outside area of the pipe-way annulus is established. The magnitude of the flow transfer under this condition depends upon the geometry of the weir section, the intrinsic properties of the liquid slurry flowing across the device and the magnitude of the liquid surface elevation difference across the weir section. Many overflow configurations can be used to accomplish this action. An embodiment of the floating device for the transfer of surface liquid into the pipe-way annulus is illustrated in FIGS. 2, 3, 4 and 5.

The method of removing scum, clumps of fibrous material and light solids floating on the liquid surface that is not entrained within the bulk liquid slurry by the action of the mixer is not an embodiment of the invention.

Bulk Vessel Circulation

Net vessel circulation is from bottom to top of the vessel by virtue of directed flow from the primary mixing nozzle and induced flow from the mixer annulus into the vessel bottom.

Conveyance of surface liquid to the pipe-way annulus via the surface mounted device, which is a part of the invention, controls circulation at the surface while the location of the intake supply fluid to the primary mixer nozzle enhances mid-zone circulation in the vessel.

Figure 9:
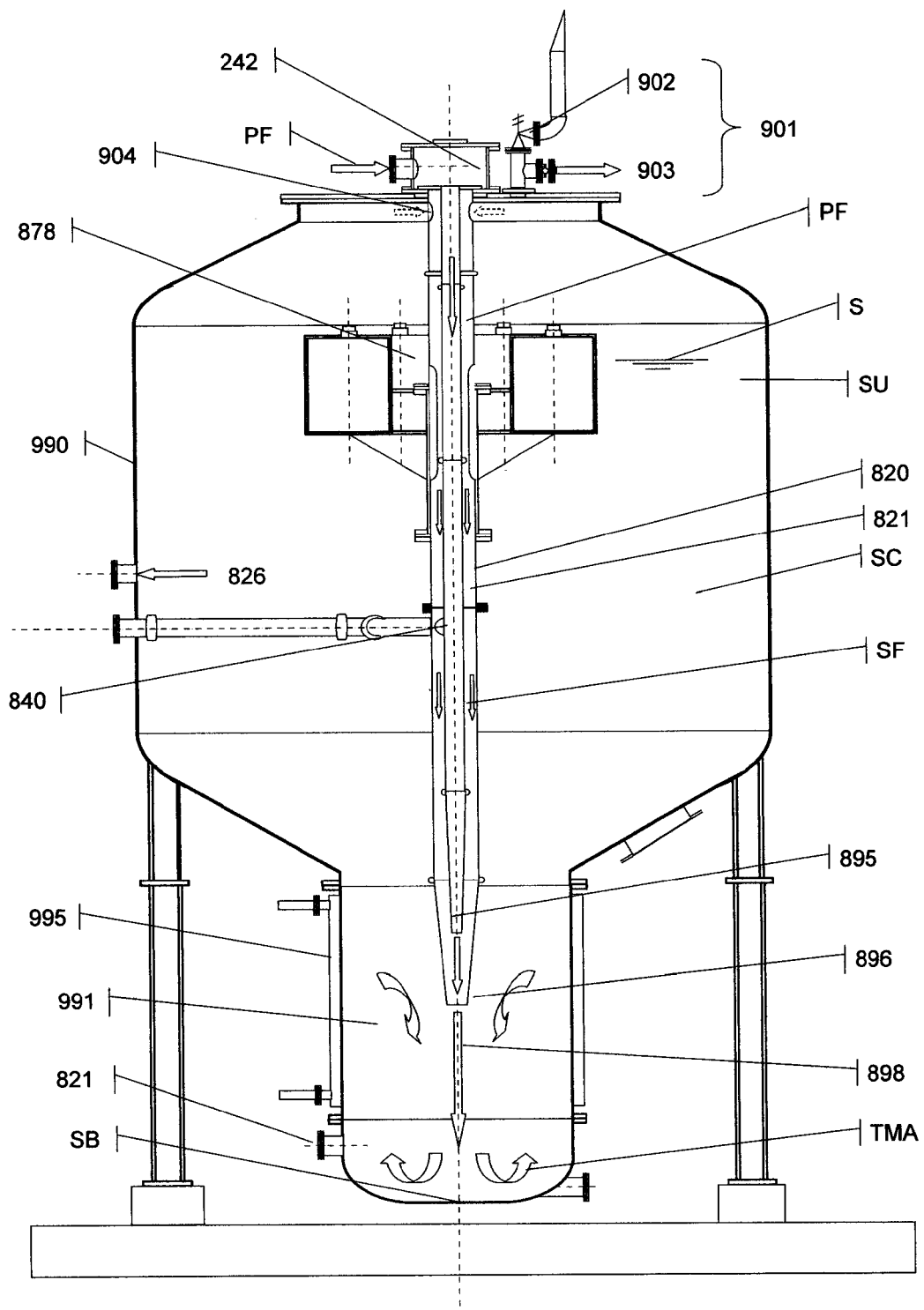
FIG. 9 is a cross sectional view of an alternate embodiment reactor having an enhanced mixing zone.

Referring next to FIG. 9 the reactor 990 has a lower part 991 with a reduced diameter to improve mixing and enhance reaction conditions. An optional heater 995 which can surround the lower part 991.

Figure 10:
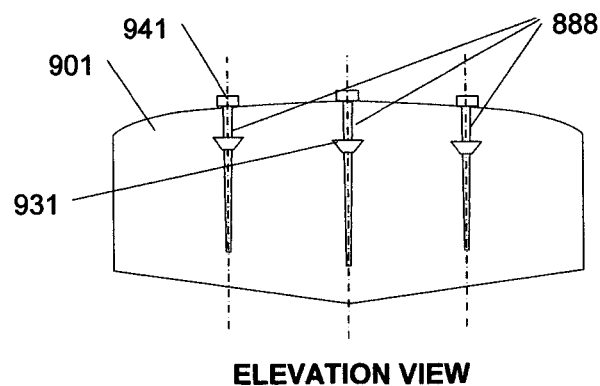
FIG. 10 is a side elevation view of a reactor with multiple drafts, each with nested nozzles.
Figure 11:
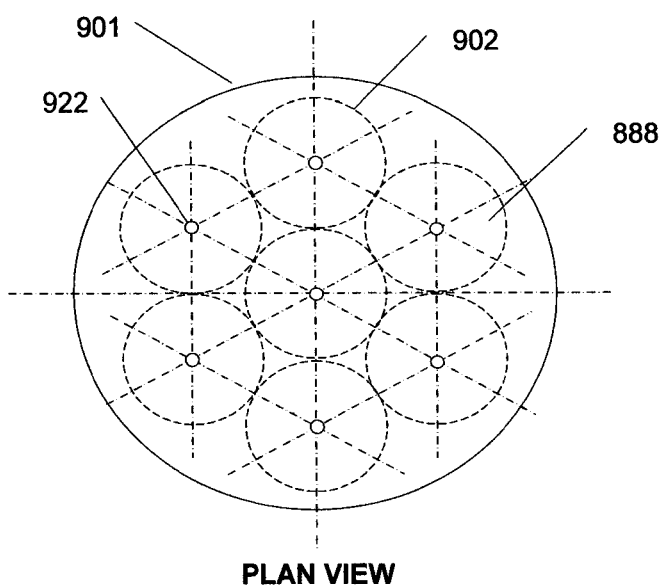
FIG. 11 is a top plan view of the FIG. 10 reactor.

Referring next to FIGS. 10, 11 a large diameter reactor 901 uses multiple (7) mixer assemblies 888.

The figure identifies common features of the mixer including the primary nozzle supply box (941), the mixer weir apparatus (931) and the secondary nozzle and supply pipe (922). Complete mixing is accomplished by locating nozzles in the packing arrangement of seven units indicated.

This packing allows the hydraulic interaction between mixers within the influence area of each mixer (902). In this arrangement the mixers could accommodate a tank diameter ranging from 70 feet (5" primary nozzle @ 20 feet/sec jet velocity) to 170 feet (5" primary nozzle @ 50 feet/sec nozzle velocity). In this embodiment of the invention the largest vessels anticipated for this configuration could be mixed.

Figure 12:
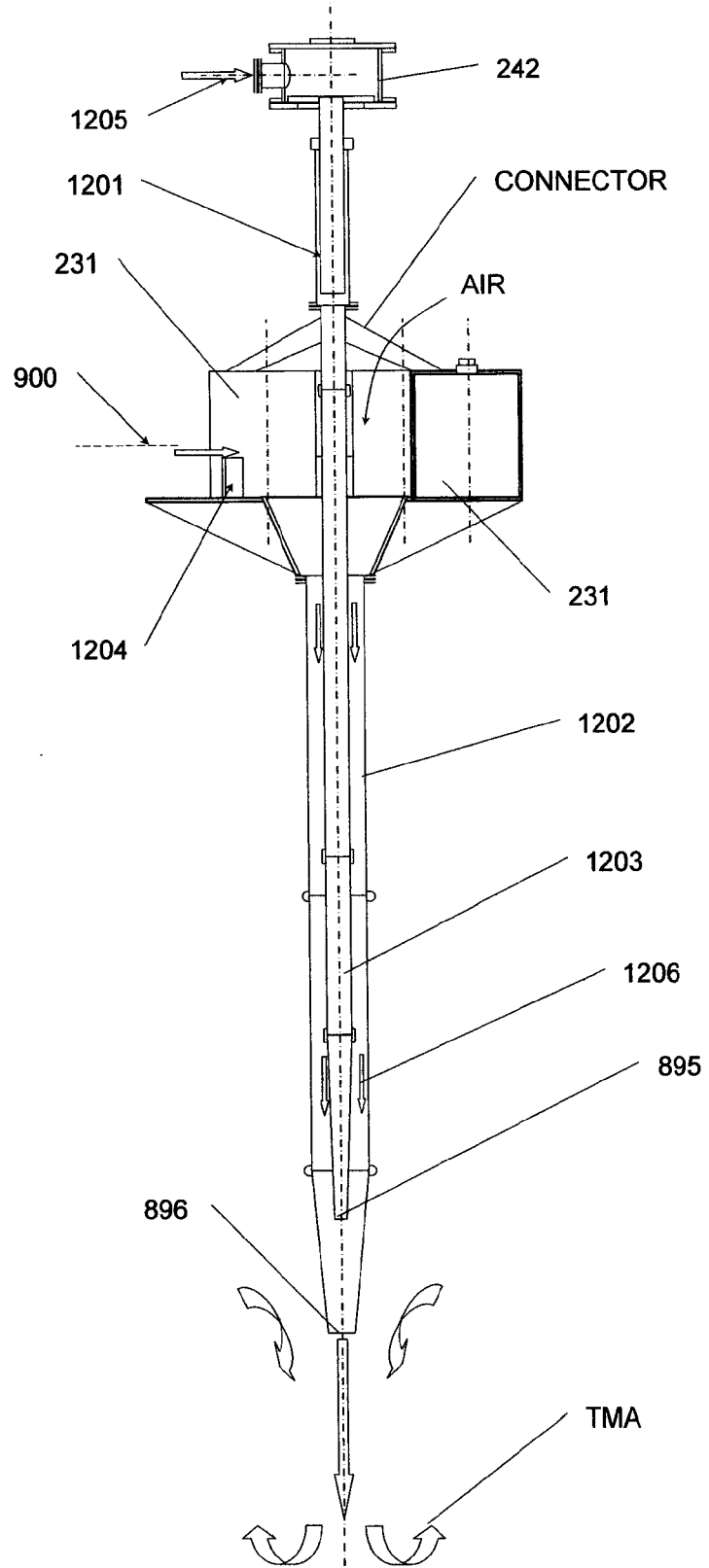
FIG. 12 is a side elevation view of a central draft embodiment where the entire inner and outer pipe assembly is attached to the floating weir to move up and down.

Referring next to FIG. 12 a double channel draft assembly 1200 has ballast tanks 231. However, the outer draft pipe 1202 along with the inner pipe 1203 are connected to the ballast tanks to move up and down as a single assembly. The top of the inner pipe 1203 is a slip tube 1201 which telescopes up to keep the primary nozzle supply box 242 at a fixed location. In operation the inlet weir 1204 rises above the slurry surface 900 when the variable flow rate fluid input 1205 is increased. In this condition air enters weir 1204, thereby evacuating annular channel 1206. This provides operational flexibility to the mixing operator.

Figure 13:
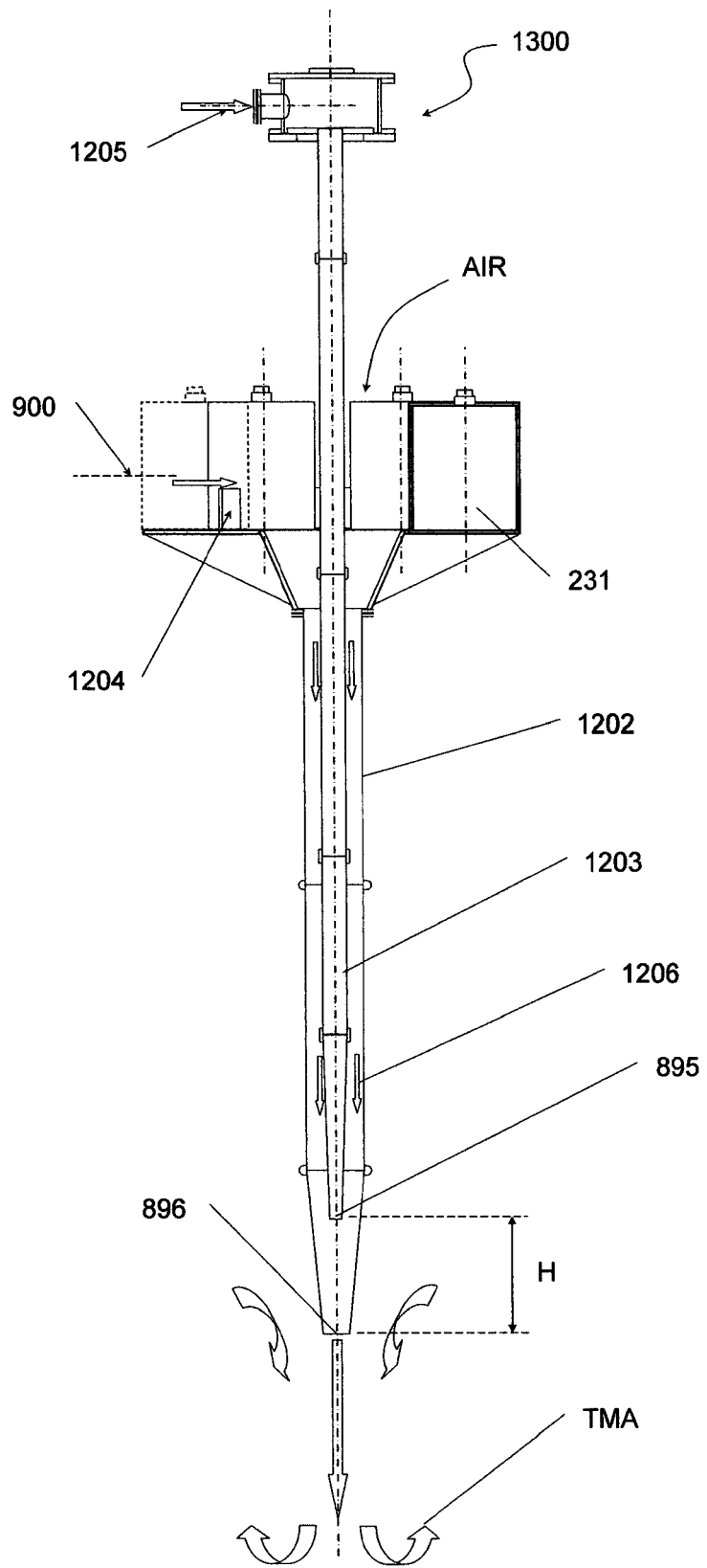
FIG. 13 is a side elevation view of a central draft embodiment where the outer pipe is attached to the floating weir to move up and down.

Referring next to FIG. 13 a double channel draft assembly 1300 has ballast tanks 231 connected only to the outer pipe 1202. Thus, distance H between the nozzles 895 and 896 varies. Channel 1206 will always have slurry and not air in it.

Figure 14:
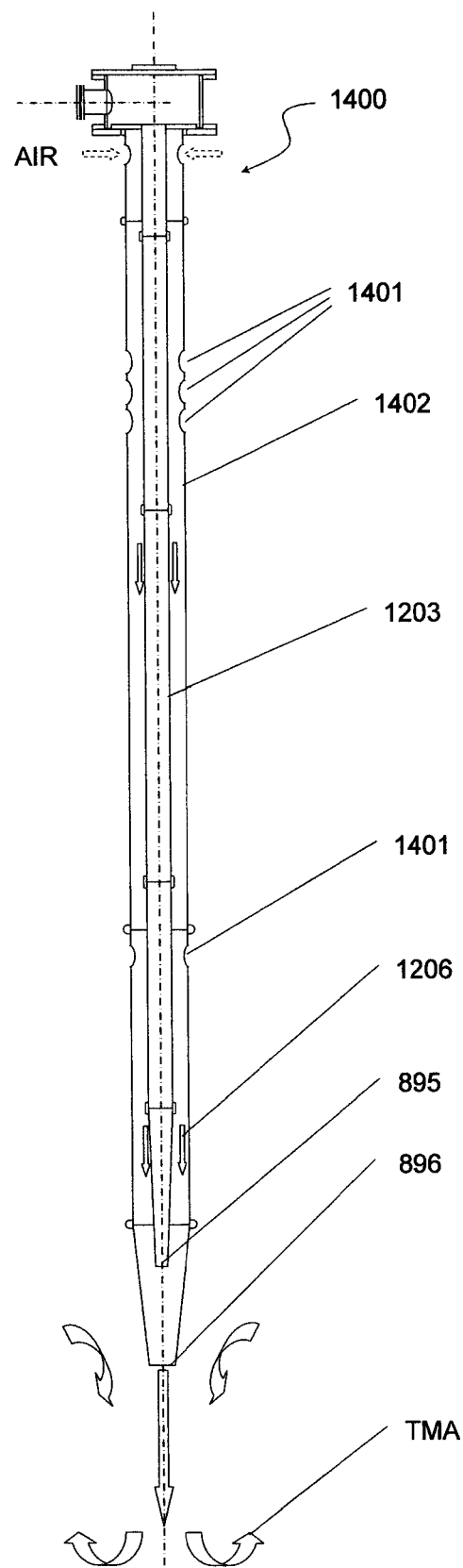
FIG. 14 is a side elevation view of a non-floating weir central draft where stationary outer pipe holes replace a floating weir.

Referring next to FIG. 14 a double channel draft assembly 1400 has slurry inlet holes 1401 in its outer pipe 1402.

Figure 15:
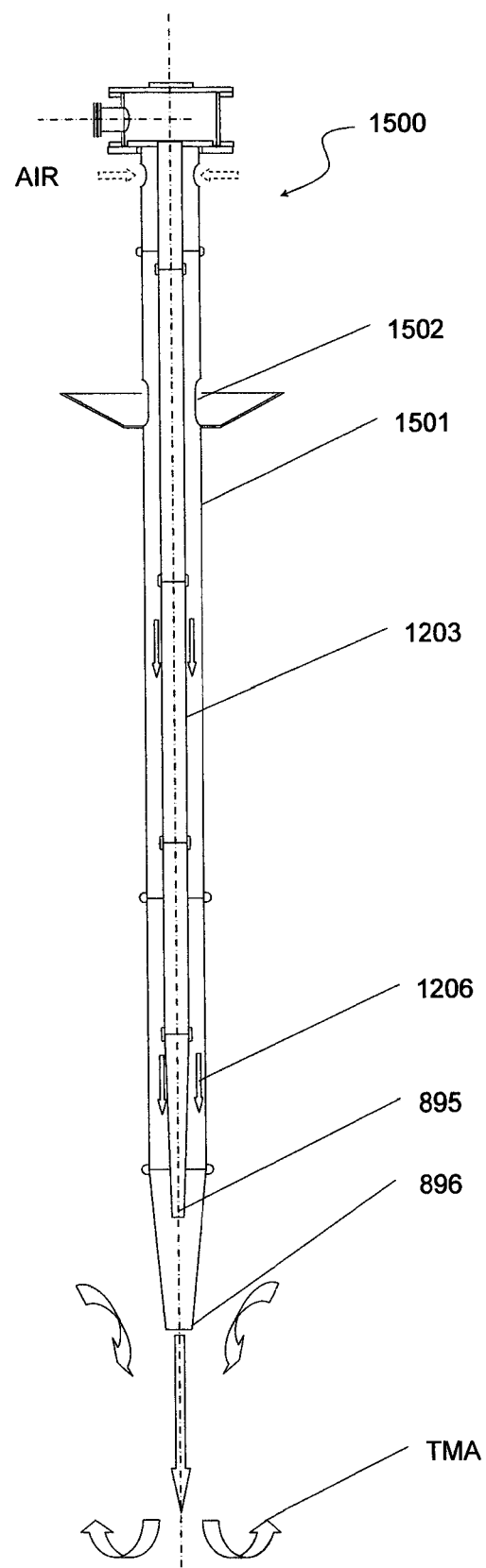
FIG. 15 is a side elevation view of a central draft having a fixed weir.

Referring next to FIG. 15 a double channel draft assembly 1500 has a fixed weir 1502 in outer pipe 1501.

| NESTED NOZZLE MIXER CONFIGURATION | | |
| --- | --- | --- |
| Type | Description | Function |
| FIG. 15 | Fixed Weir Supply/Fixed Primary and Secondary Nozzle Location | Mixer nozzle locations are fixed in reference to the bottom of the vessel. Fixed weir is located near the tank top and submerged. Primary nozzle velocity induces intense mixing at the bottom of the tank and draws liquid from the top of the tank. Configuration is suitable for tanks with a constant surface level. |
| FIG. 14 | Orifice Supply/Fixed Primary and Secondary Nozzle Location | Mixer nozzle locations are fixed in reference to the bottom of the vessel. Fixed openings are strategically located along the secondary nozzle supply pipe. Primary nozzle velocity induces intense mixing at the bottom of the tank. Liquid is drawn from the various locations at various intended rates along tank center. Configuration is suitable for tanks with a varying or constant surface level. |
| FIG. 3 | Floating Weir Supply/Fixed Primary and Secondary Nozzle Location | Mixer nozzle locations are fixed in reference to the bottom of the vessel. Floating weir is located at the water surface in the tank. Weir submergence is fixed. Primary nozzle velocity induces intense mixing at the bottom of the tank and draws liquid from the top of tank in precise quantity. Configuration is suitable for tanks with varying surface level and tanks where surface skimming is desired. |
| FIG. 13 | Floating Weir Supply and Secondary | Mixer primary nozzle location is fixed in reference to the bottom of the vessel. Floating weir is located at the water surface in the |

| Type | Description | Function |
|---|---|---|
| | Nozzle/Fixed Primary Location | tank. Weir submergence is fixed. Floating secondary nozzle is located at the bottom of the vessel. Distance between primary and secondary velocity induces intense mixing at the bottom of the tank and draws liquid from the top of tank at a quantity that varies with vessel surface level and primary nozzle flow rate. Configuration is suitable for tanks with varying surface level and tanks where surface skimming is desired. |
| FIG. 12 | Floating Weir Supply Secondary and Primary Nozzle float. | Floating weir is located at the water surface in the tank. Weir submergence is fixed. Floating primary and secondary nozzles are located at the bottom of the vessel. Distance between primary/secondary nozzle and vessel bottom varies with vessel surface level. Primary nozzle velocity induces mixing at the bottom of the tank and draws liquid from the top of tank at a quantity that varies with vessel surface level and primary nozzle flow rate. Mixing intensity at bottom of tank varies with relative location of the primary nozzle to the vessel bottom. Configuration is suitable for tanks with varying surface level and tanks where surface skimming is desired. |

NESTED NOZZLE MIXER CONFIGURATION

The mixer is described as providing mixing in three distinctive modes and zones in a storage vessel. In all cases the flow stream components were liquids and liquid slurries.

An additional feature of the mixer design is that it is also capable of mixing in a gas/liquid mixing scenario. In this mode the intensity of the primary nozzle flow is sufficient to draw the liquid level down in the mixer annulus to a level in which gas in the tank head space is drawn through the secondary nozzle where it is dispersed at the bottom of the tank and floats to the surface. This creates another mixing regime desired in many vessel mixing applications. This pattern creates a bottom to top circulation significantly different than the previously described mixer performance in which only liquids and liquid slurries are involved. In applications where surface gas diffusion into the vessel bulk contents is desired this mixer can provide a mixing/gas diffusion capability in one unit where two separate vessel processing systems would normally be required.

Gas/liquid mixing can be provided for mixer configuration types 4 and 5 by precisely controlling the primary nozzle flow velocity and floating weir submergence. In this case liquid/liquid slurry mixing would occur at a lower primary nozzle flow velocity than gas/liquid mixing.

A threshold flow condition in the primary nozzle would void the annulus and reduce the floating weir submergence through mixer buoyant effects. The weir would eventually surface, cutting any liquid flow to the annulus. Headspace gas would than be drawn through the annulus to the primary nozzle location where it would disperse to the vessel bottom.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. A mixing system comprising:
a mixing tank having a bottom, sides and a top;
a double channel central draft tube;
a pump forcing an inlet fluid downward through a central channel in the double channel central draft tube;
said central channel having a primary nozzle facing downstream;
an outer draft channel housing the central channel;
wherein an annular space between the outer draft channel and the central channel forms a secondary channel;
said outer draft channel having a secondary nozzle facing downstream;
wherein said primary nozzle is located above said secondary nozzle, and both nozzles share a common longitudinal axis;
said outer draft channel having an inlet weir for channeling a mixing tank fluid into the secondary channel;
wherein the pump has a variable flow rate controller;
wherein said variable flowrate forms a vacuum at a bottom end of the outer draft channel;
wherein said vacuum induces the mixing tank fluid into the weir and out the secondary nozzle at a low flowrate setting of the controller;
wherein a combined flow from the primary and secondary nozzles impinge the bottom of the mixing tank;
wherein said outer draft channel is connected to the central channel, and the connected channels are fastened to a ballast tank so as to float both channels up and down;
said central channel having an upper slip tube to maintain a fixed location top end to the central channel; and
wherein a high flowrate setting of the controller lifts the inlet weir above a fluid surface, thereby sucking air into the inlet weir and emptying the secondary channel to provide an air and fluid combined flow from the secondary nozzle.

2. The mixing system of claim 1, wherein the pump has a fluid inlet port located in a center mixing zone of the mixing tank.

3. The mixing system of claim 2, wherein the primary nozzle has an inside diameter=d1, the secondary nozzle has an inside diameter=d2, and d2/d1=a range of 2.1 to 2.5.

* * * * *